(12) United States Patent
Li-Chen

(10) Patent No.: US 6,708,603 B1
(45) Date of Patent: Mar. 23, 2004

(54) FRYING POT

(75) Inventor: Wu Chang Li-Chen, Pa-Te (TW)

(73) Assignee: Lyu Jan Co., Ltd., Taoyuan Hsien (TW)

( * ) Notice: Subject to any disclaimer, the term of this patent is extended or adjusted under 35 U.S.C. 154(b) by 0 days.

(21) Appl. No.: 10/608,600

(22) Filed: Jun. 30, 2003

(51) Int. Cl.[7] .............................. A47J 37/00; A47J 37/12
(52) U.S. Cl. .............................. 99/409; 99/330; 99/403; 99/416; 99/472
(58) Field of Search ..................... 99/330–333, 341, 99/342, 352–355, 403–410, 426, 427, 411–418, 444–450, 483, 323.5; 366/234; 426/523, 438

(56) References Cited

U.S. PATENT DOCUMENTS

| | | | | |
|---|---|---|---|---|
| 950,557 A | * | 3/1910 | Roe ........................... 215/12.1 |
| 2,027,146 A | * | 1/1936 | Bly et al. ........................ 99/355 |
| 2,735,357 A | * | 2/1956 | Gagnon ........................ 99/409 |
| 3,718,485 A | * | 2/1973 | Lankford ..................... 426/438 |
| 3,973,481 A | * | 8/1976 | Mies ............................. 99/408 |
| 4,059,046 A | * | 11/1977 | Yamazaki et al. ............. 99/355 |
| 4,873,920 A | * | 10/1989 | Yang ............................. 99/409 |
| 5,543,166 A | * | 8/1996 | Masel et al. ................. 426/523 |
| 5,592,869 A | * | 1/1997 | Zittel ............................. 99/348 |
| 5,611,265 A | * | 3/1997 | Ronci et al. ................... 99/353 |
| 5,669,288 A | * | 9/1997 | Zittel et al. .................... 99/348 |
| 6,453,801 B1 | * | 9/2002 | Masel et al. ................... 99/330 |
| 6,523,457 B1 | * | 2/2003 | Ancona et al. ................ 99/330 |

\* cited by examiner

Primary Examiner—Timothy F. Simone
(74) Attorney, Agent, or Firm—Birch, Stewart, Kolasch & Birch, LLP

(57) ABSTRACT

A frying pot includes a container for receiving therein frying oil, a screen body rotatably and movably received in the container, a casing with an escalating device mounted therein to control the movement and rotation of the screen body. With the rotation and movement of the screen body in the container that is received in the casing, the amount of the frying oil is saved.

3 Claims, 6 Drawing Sheets

FRYING POT

BACKGROUND OF THE INVENTION

1. Field of the Invention

The present invention relates to a frying pot, and more particularly to a frying pot with which volume of the cooking oil in the frying pot can be saved by almost a half.

2. Description of Related Art

Nowadays, when discussing about food preparation, frying may be the only kind of method that requires enormous amount of cooking oil in the pot. Examining the frying device in the fast food restaurant, it is noted that the frying device includes a screen with a handle and a pot. Before the food is fried, the pot is full of cooking oil and then the cooking oil is heated. Thereafter, the operator places the food to be fried in the screen and immerses the screen together with the food in the heated cooking oil. During the frying process, the operator has to monitor the food color change in order to turn the food to ensure every part of the food is evenly fried. After the food is evenly fried, the operator lifts the screen and places the screen with the food received in the screen on a shelf to allow extra cooking oil on the food to drip back into the pot. The method of preparing food suffers several disadvantages, which causes a lot of waste and trouble.

The first disadvantage of the conventional frying method is that in order to ensure every part of the food is evenly fried, the level of the cooking oil in the pot has to be higher than the height of the food such that the food is literally immersed in the cooking oil before the preparation starts. The second disadvantage is that when the food is fried, the food has to be turned over constantly such that the food can be fried evenly and has a golden color. However, due to operator's negligence, when the food is not turned over in time, the food is ruined and therefore the cooking oil is wasted. In the meantime, because the food requires the operator's attention in proceeding with the frying process, the efficiency in the kitchen is low. A further disadvantage of the conventional frying method is time factor. When the food in the pot is longer or shorter than what is supposed to be, the food is either ruined or is still not edible, which causes the waste of food and cooking oil.

To overcome the shortcomings, the present invention intends to provide an improved frying pot to mitigate the aforementioned problems.

SUMMARY OF THE INVENTION

A primary objective of the invention is to provide an improved frying pot that is able to rotate automatically to ensure the food is fried evenly and thus the cooking oil amount is saved.

Another objective of the invention is to provide a timer in the frying pot such that after the frying time is set, the operator is able to attend other matters without monitoring the food and therefore, the efficiency in the kitchen is improved.

Other objects, advantages and novel features of the invention will become more apparent from the following detailed description when taken in conjunction with the accompanying drawings.

DETAILED DESCRIPTION OF THE PREFERRED EMBODIMENT

Figure 1:
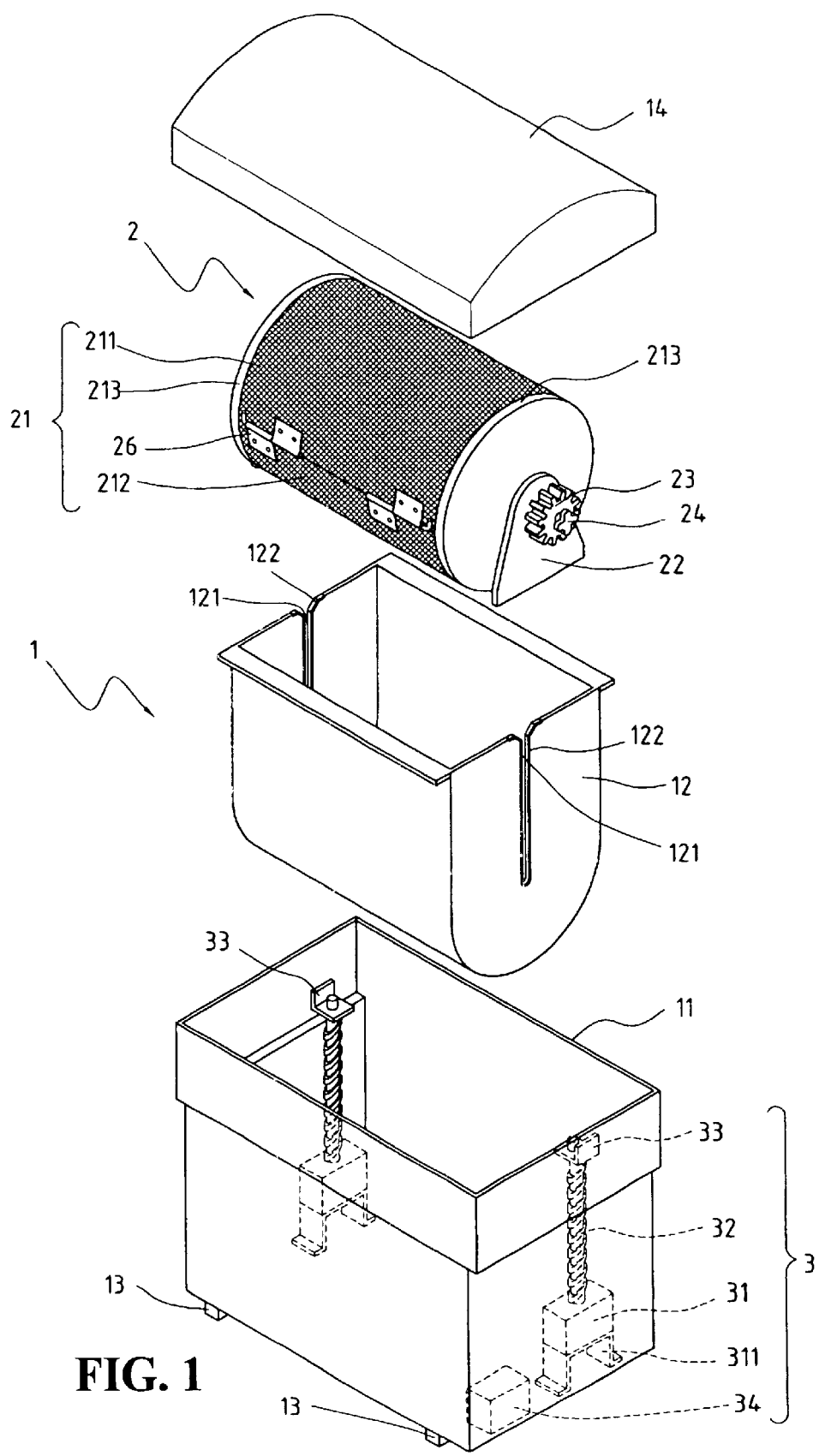
FIG. 1 is an exploded perspective view of a frying pot in accordance with the present invention.
Figure 2:
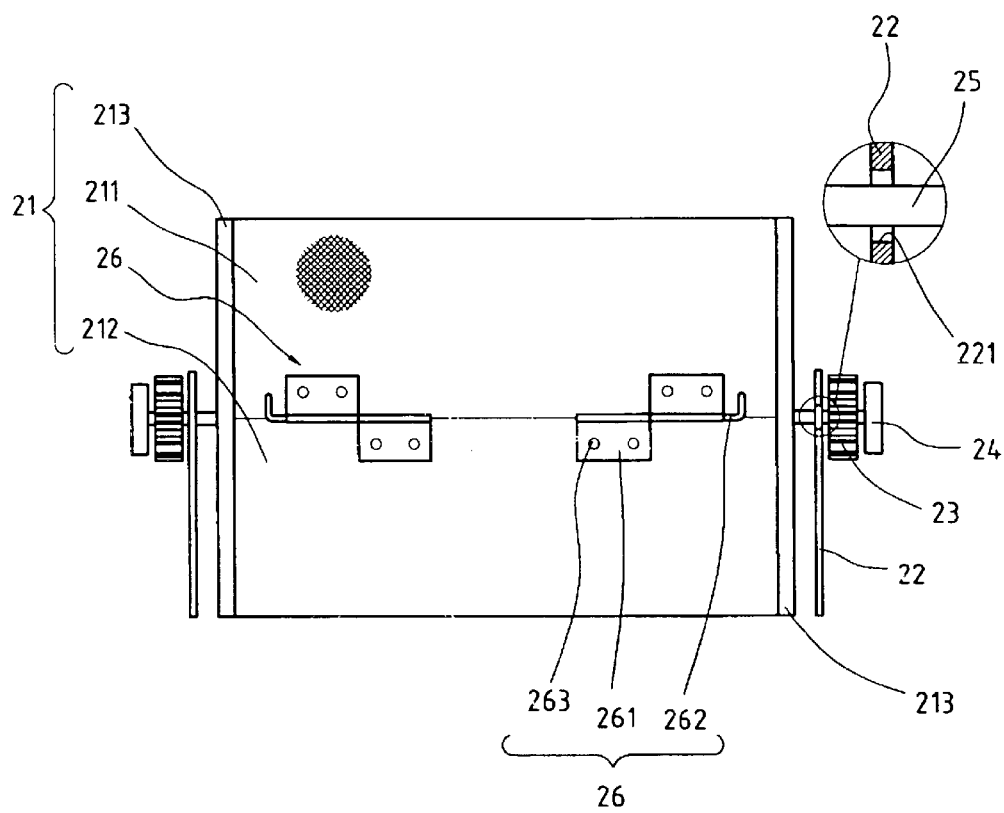
FIG. 2 is a side elevational view of a frying screen of the frying pot in accordance with the present invention.
Figure 3:
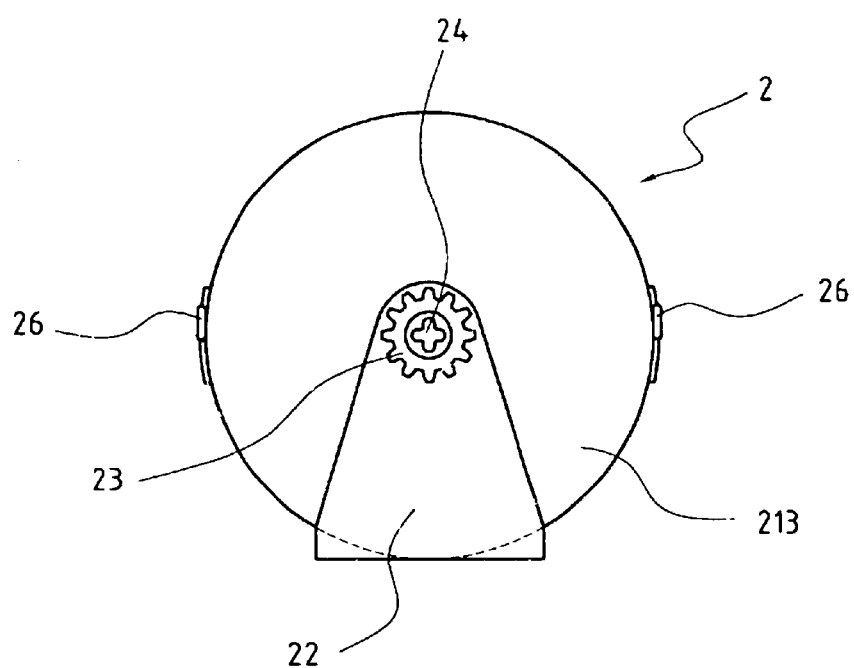
FIG. 3 is an end view of the frying screen.
Figure 4:
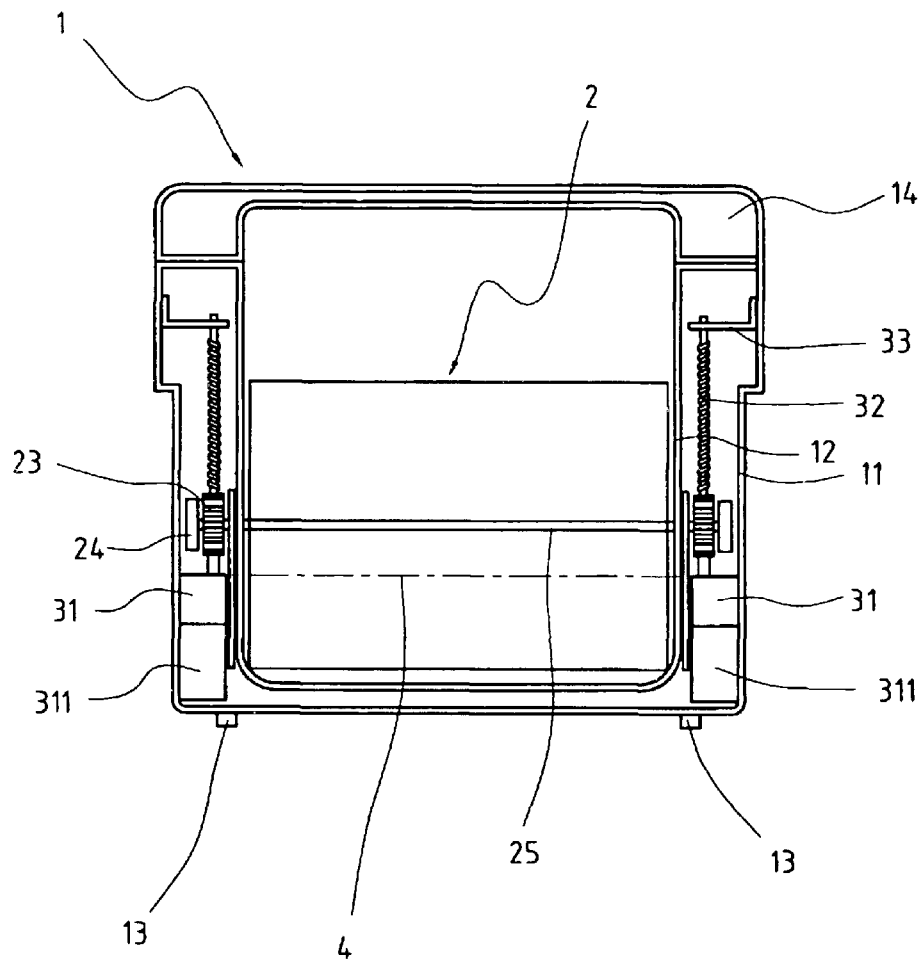
FIG. 4 is a cross-sectional view the frying pot of the present invention.
Figure 5:
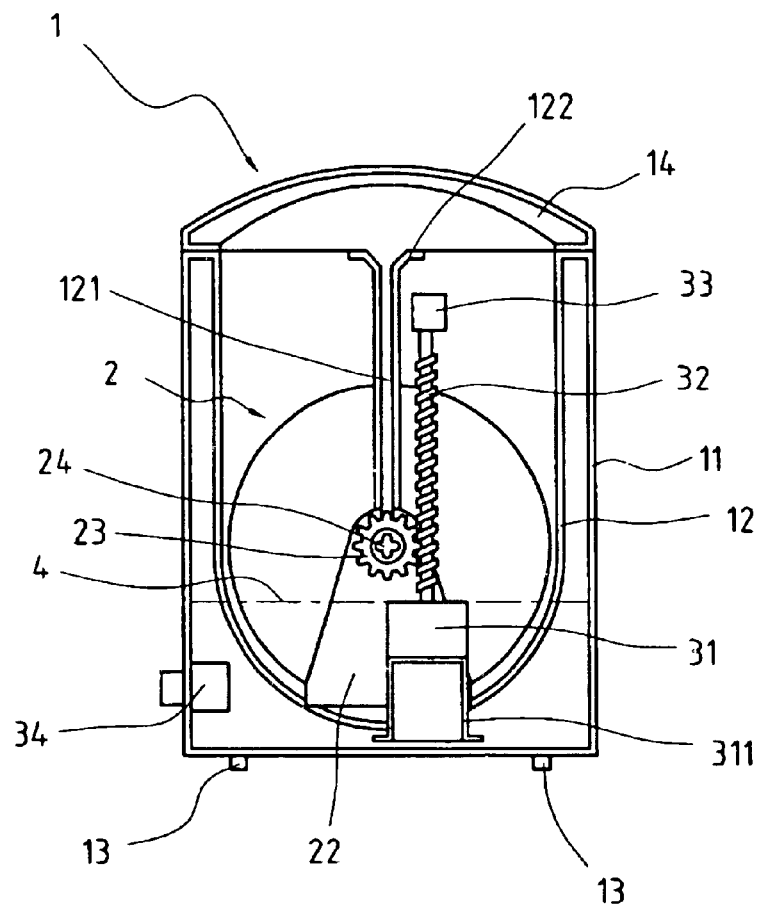
FIG. 5 is another cross-sectional of the frying pot of the present invention.
Figure 6:
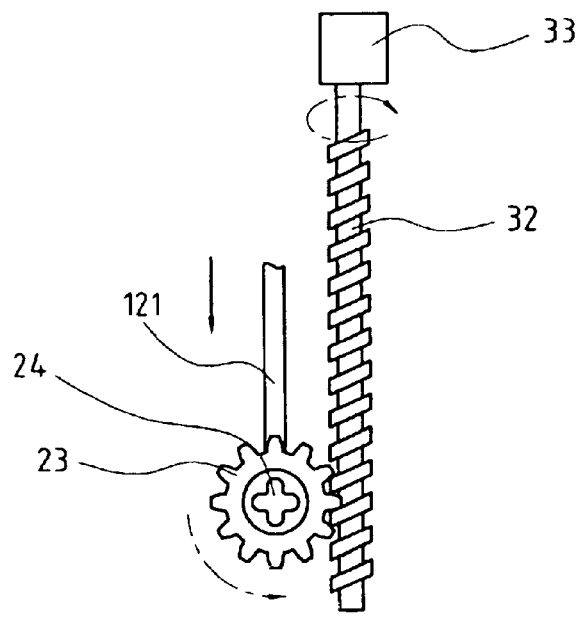
FIG. 6 is a side elevational view showing the frying screen is descending due to the rotation of a threaded bolt of an escalating device.
Figure 7:
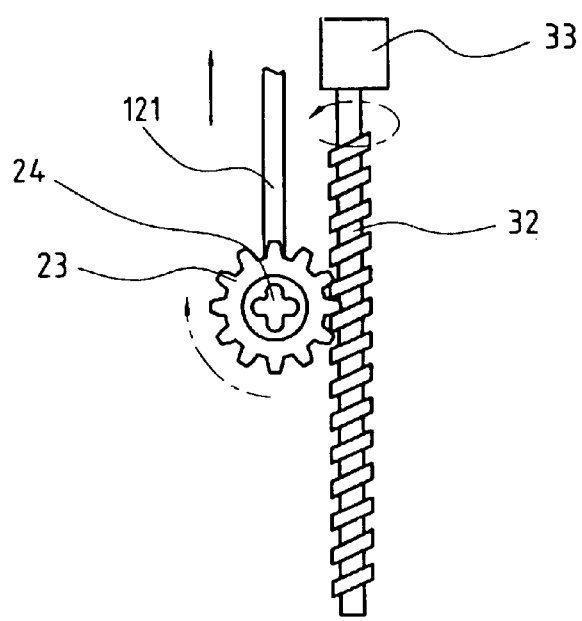
FIG. 7 is a side elevational view showing the frying screen is ascending due to the rotation of the threaded bolt of the escalating device.

With reference to FIGS. 1, 2 and 3, a frying pot constructed in accordance with the present invention comprises a container assembly 1, a frying screen 2 and an escalating device 3.

The container assembly 1 has a container 12 with only an opening defined in a top end of the container 12, a cover 14 detachably connected to the container 12 to cover the opening of the container 12 and a casing 11 defined a receiving space (not labeled) to receive therein the container 12 and having four pads 13 (only being visible in the drawing) formed on an outer bottom face of the casing 11 to support the casing 11 on a fixture. The container 12 further has two slits 121 oppositely and respectively defined in a side face of the container 12 and provided with a silicon covering 122 on a peripheral edge defining the slit 121.

The frying screen 2 comprises a screen body 21, a bracket 22 securely formed on two opposite side of the screen body 21, a gear 23 formed on the bracket 22 and a handle 24 formed on an outer side face of the gear 23. A shaft 25 is provided to extend through a through hole 221 in the bracket 22 to securely connect the gear 23 to the frying screen 2. The screen body 21 includes an arcuate top screen 211 and an arcuate bottom screen 212 connected to the top screen 211 by at least one (two being shown in the embodiment) fastening device 26 which is composed of two fastening plates 261, a pin 262 extending through the two fastening plates 261 and rivets 263 provided to respectively and securely fasten the two fastening plates 261 on the top screen 211 and the bottom screen 212. Thereafter, after the top screen 211 and the bottom screen 212 are assembled, a cylindrical screen body is formed and that the top screen 211 is pivotal with respect to the bottom screen 212. A supporting rim 213 is formed on the assembled cylindrical screen body and has the shaft 25 centrally extended therethrough such that the screen body 21 is rotated together with the shaft 25.

The escalating device 3 includes two server motors 31 oppositely formed on two stands 311 that are formed on two opposite inner sides of the casing 11, two threaded bolt 32 respectively and rotatably mounted on top of a corresponding one of the two server motors 31 to be driven by the corresponding server motor 31, an L-shaped fixing bracket 33 respectively provided on two opposite inner sides of the casing 11 to allow a free end of a corresponding one of the two threaded bolts 32 to extend therethrough and an electronic timer 34 securely mounted inside the casing 11 and electrically connected to the server motors 31 to control activation and deactivation of the two server motors 31.

With reference to FIGS. 4–7, when the frying pot of the present invention is in assembly, the cylindrical screen body 21 is received in the container 12 with the shafts 25 to be respectively received in a corresponding one of the slits 121 and the gears 23 to be matched with a corresponding one of the two threaded bolts 32. Thereafter, placing the cover 14 on top of the casing 11 to close the opening of the container 12 completes the assembly of the frying pot of the present invention.

Before the frying pot of the present invention is in operation by the operation of the two server motors 311, the timer 34 is set first to determine how long the server motors 31 are going to rotate. Then, a minimum amount of frying oil is poured into the container and the cylindrical screen body 21 is rotated and moved upward and downward by the rotation of the two threaded bolts 32. Due to the rotational movement and reciprocal upward and downward movement of the screen body 21, food inside the screen body 21 is evenly fried. Furthermore, by the provision of the timer 34, the operator is able to attend other matters without watching the frying pot all the time so as to increase the efficiency in the kitchen. In the meantime, because of the rotational movement of the screen body 21, the amount of the frying oil is saved dramatically.

even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A frying pot comprising:
  a container assembly having a container for receiving therein frying oil, the container defining an opening in a top end of the container, a cover detachably connected to the container to cover the opening of the container and a casing defined with a receiving space to receive therein the container and having four pads formed on an outer bottom face of the casing for supporting the casing on a fixture, the container further having two slits oppositely and respectively defined in a side face of the container and provided with a silicon covering on a peripheral edge defining the slit;
  a frying screen for receiving food therein including a screen body, two brackets respectively and securely formed on opposite sides of the screen body, two gears each formed on a corresponding one of the two bracket, two handles each formed on an outer side face of a corresponding one of the two gear, and a shaft provided to extend through a through hole in the bracket to securely connect the gear to the frying screen;
  an escalating device having two server motors oppositely formed on two stands which are formed on two opposite inner sides of the casing, two threaded bolt respectively and rotatably mounted on top of a corresponding one of the two server motors to be driven by the corresponding server motor so as to drive the screen body to rotate and reciprocally move upward and downward, an L-shaped fixing bracket respectively provided on two opposite inner sides of the casing to allow a free end of a corresponding one of the two threaded bolts to extend therethrough and an electronic timer securely mounted inside the casing and electrically connected to the server motors to control activation and deactivation of the two server motors.

2. The frying pot as claimed in claim 1, wherein the screen body includes an arcuate top screen and an arcuate bottom screen connected to the top screen by at least one fastening device which is composed of two fastening plates, a pin extending through the two fastening plates and rivets provided to respectively and securely fasten the two fastening plates on the top screen and the bottom screen so as to form a cylindrical screen body and allow the top screen to be pivotal with respect to the bottom screen.

3. The frying pot as claimed in claim 2, wherein a supporting rim is formed on the cylindrical screen body and has the shaft centrally extended therethrough such that the screen body is rotated together with the shaft.

\* \* \* \* \*